US007961084B2

(12) United States Patent
Aso et al.

(10) Patent No.: US 7,961,084 B2
(45) Date of Patent: Jun. 14, 2011

(54) HOST VEHICLE MOVING AREA ACQUISITION DEVICE AND ACQUISITION METHOD

(75) Inventors: Kazuaki Aso, Susono (JP); Masahiro Harada, Susono (JP); Toshiki Kindo, Yokohama (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/155,437

(22) Filed: Jun. 4, 2008

(65) Prior Publication Data

US 2008/0303696 A1 Dec. 11, 2008

(30) Foreign Application Priority Data

Jun. 5, 2007 (JP) ................................ 2007-149506

(51) Int. Cl.
*B60Q 1/00* (2006.01)

(52) U.S. Cl. ......................... 340/436; 340/435; 340/903

(58) Field of Classification Search .................. 340/903, 340/435, 436
See application file for complete search history.

(56) References Cited

U.S. PATENT DOCUMENTS

2004/0090117 A1* 5/2004 Dudeck et al. ................ 303/191
2005/0073438 A1* 4/2005 Rodgers et al. ............... 340/944
2006/0247852 A1* 11/2006 Kortge et al. ................. 701/209

FOREIGN PATENT DOCUMENTS

| | | |
|---|---|---|
| JP | A-9-132093 | 5/1997 |
| JP | A 11-348799 | 12/1999 |
| JP | A 2000-276696 | 10/2000 |
| JP | A-2002-2518 | 1/2002 |
| JP | A 2003-063430 | 3/2003 |
| JP | A 2003-228800 | 8/2003 |
| JP | B2 3451321 | 9/2003 |
| JP | A 2006-154967 | 6/2006 |
| JP | A 2007-041788 | 2/2007 |

OTHER PUBLICATIONS

Japanese Office Action filed in corresponding Japanese patent application No. 2007-149506 on Apr. 14, 2009 (with English-language translation).

* cited by examiner

*Primary Examiner* — Daniel Wu
*Assistant Examiner* — Frederick Ott
(74) *Attorney, Agent, or Firm* — Oliff & Berridge, PLC

(57) ABSTRACT

A movable area acquisition ECU 1 compares a possible path for a host vehicle and a predicted path of another vehicle in a travel area of the host vehicle with each other to obtain a possibility of collision between the two vehicles, thus computing a degree of danger to the host vehicle. If the degree of danger to the host vehicle exceeds a predetermined threshold, the travel area is extended and then a degree of danger to the host vehicle is computed and acquired.

10 Claims, 10 Drawing Sheets

FIG. 3

| PRIORITY LEVEL | AREA ID | MINIMUM ALLOWABLE SAFETY DEGREE |
|---|---|---|
| 1 | A (AREA IN WHICH TRAFFIC RULES ARE FOLLOWED) | 95% |
| 2 | B (AREA IN WHICH SOME OF TRAFFIC RULES ARE FOLLOWED) | 90% |
| 3 | C (ALL AREAS) | – |

HOST VEHICLE MOVING AREA ACQUISITION DEVICE AND ACQUISITION METHOD

INCORPORATION BY REFERENCE

The disclosure of Japanese Patent Application No. 2007-149506 filed on Jun. 5, 2007 including the specification, drawings and abstract is incorporated herein by reference in its entirety.

BACKGROUND OF THE INVENTION

1. Field of the Invention

The present invention relates to a host vehicle moving area acquisition device and acquisition method for acquiring a path along which a host vehicle travels while avoiding collision with an obstacle such as another vehicle.

2. Description of Related Art

A steering assist device is known which assists the steering of a host vehicle by imparting auxiliary torque. When the host vehicle travels in a moving area, there are cases where, for example, the host vehicle continues to travel in the same current lane or changes its travel direction by moving to an adjacent lane or the like. The steering assist method, including the amount of steering torque to be imparted or the like, differs between when the host vehicle continues to travel in the same lane and when the host vehicle changes its travel direction. Accordingly, there is a steering assist device which determines whether or not the host vehicle will continue to move in the current lane or change its travel direction, and determines the assist method on the basis of the determination result (see, for example, Japanese Patent Application Publication No. 2002-2518 (JP-A-2002-2518)).

However, there may be a case where an accident has occurred, or an obstacle such as another vehicle is traveling, in a travel area in which the host vehicle travels. Even in such a case, the steering assist device disclosed in JP-A-2002-2518 determines the assist method on the basis of whether or not the host vehicle will continue to move in the current lane or change its travel direction. Thus, in some cases, overlap may occur between the travel area of the host vehicle and a dangerous area or area not appropriate for travel which has been created due to an accident, another vehicle traveling the wrong way, or the like.

SUMMARY OF THE INVENTION

The present invention provides a host vehicle moving area acquisition device that can appropriately acquire the moving area of a host vehicle even in a case where a dangerous area or area not appropriate for travel has been created due to an accident, another vehicle traveling the wrong way, or the like.

According to a first aspect of the present invention, a host vehicle moving area acquisition device includes a moving area setting portion that sets a moving area in which a host vehicle can move, and a traffic condition acquisition portion that acquires a traffic condition around the host vehicle, and the moving area setting portion adjusts the moving area on the basis of the traffic condition.

In the host vehicle moving area acquisition device according to this aspect, the moving area is adjusted on the basis of the traffic condition around the host vehicle acquired by the traffic condition acquisition portion. Thus, even in a case where, for example, a dangerous area or area not appropriate for travel has been created due to an accident, another vehicle traveling the wrong way, or the like, it is possible to set a host vehicle moving area that avoids the dangerous area or area not appropriate for travel which has been created due to an accident, another vehicle traveling the wrong way, or the like. Therefore, even in a case where a dangerous area or area not appropriate for travel has been created due to an accident, another vehicle traveling the wrong way, or the like, the moving area of the host vehicle can be acquired appropriately.

The traffic condition acquisition portion may include a host vehicle path acquisition portion that acquires a plurality of paths of the host vehicle in the moving area, an obstacle path acquisition portion that acquires a path of an obstacle in the vicinity of the host vehicle, and a safety degree acquisition portion that acquires a safety degree, which represents a probability of no collision between the host vehicle and the obstacle, on the basis of each of the paths of the host vehicle and the path of the obstacle. The traffic condition may include the safety degree acquired by the safety degree acquisition portion, and the moving area setting portion may acquire an extended area in which the moving area of the host vehicle is extended, if the safety degree is equal to or lower than a predetermined threshold.

In this way, if the safety degree acquired by the safety degree acquisition portion is equal or lower than the predetermined threshold, an extended area in which the moving area of the host vehicle is extended is acquired, thereby making it possible to avoid collision with an obstacle in a suitable manner.

Further, a steady-state moving area under a steady state condition, and a non-steady state moving area under a non-steady state condition may be switched on the basis of the traffic condition.

By switching the moving area between when in a steady-state condition and when in a non-steady state condition in this way, even under a non-steady state condition, the moving area can be acquired while avoiding going by the location where an accident or the like has occurred. The moving area of the host vehicle can be thus acquired in a more suitable manner.

The host vehicle moving area acquisition device according to the present invention can appropriately acquire the moving area of a host vehicle, even in a case where a dangerous area or area not appropriate for travel has been created due to an accident, another vehicle traveling the wrong way, or the like.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 3 is a diagram showing an area ID determination table;

FIGS. 8A, 8B, 8C are diagrams each showing possible paths for a host vehicle, of which FIG. 8A shows the case of an area ID "A", FIG. 8B shows the case of an area ID "B", and FIG. 8B shows the case of an area ID "C";

FIGS. 9A, 9B, 9C are diagrams each showing a host vehicle path selected from among possible paths for the host vehicle, of which FIG. 9A shows the case of an area ID "A", FIG. 9B shows the case of an area ID "B", and FIG. 9C shows the case of an area ID "C"

DETAILED DESCRIPTION OF THE EMBODIMENTS

Figure 1:
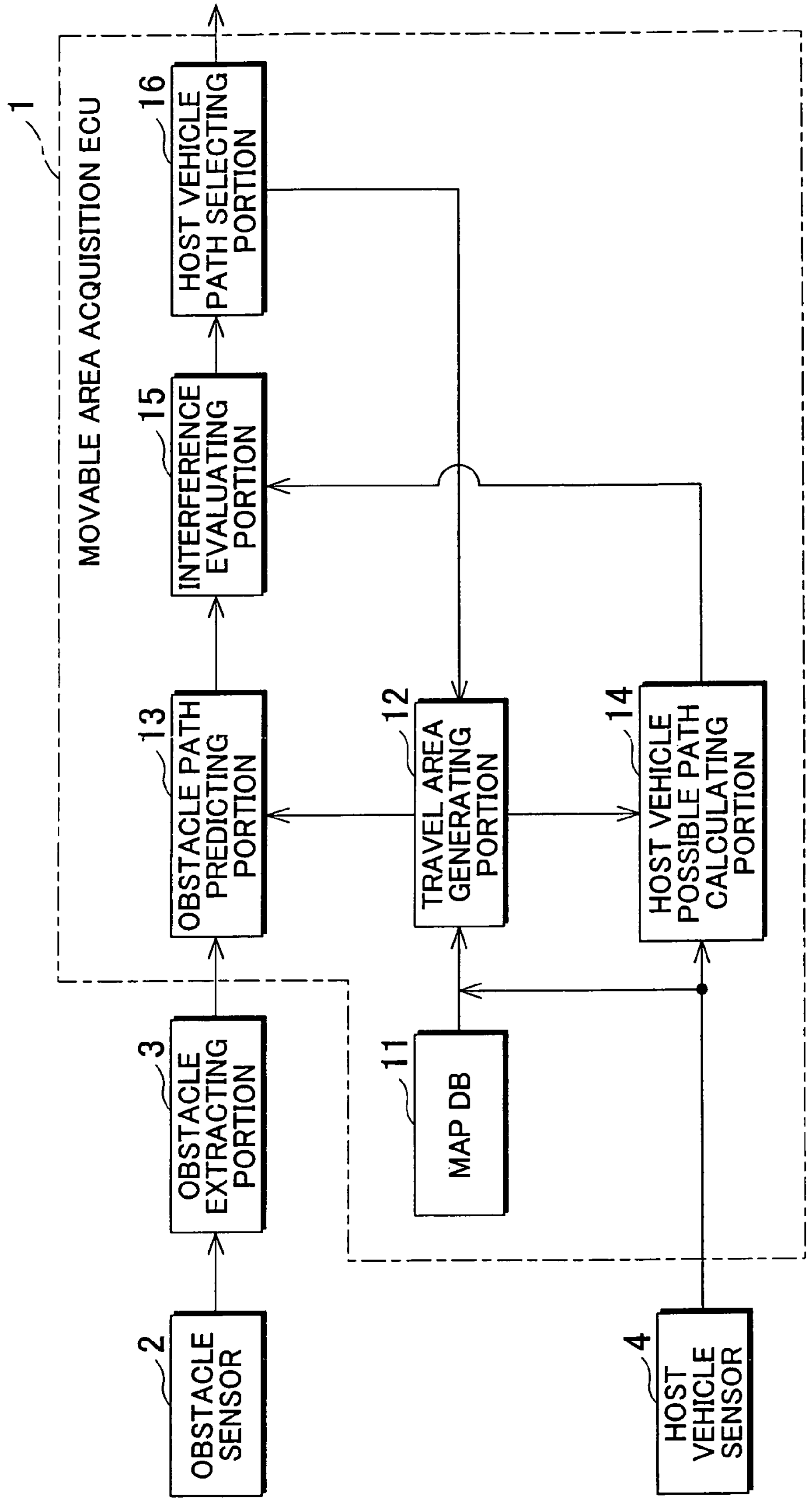
FIG. 1 is a block diagram showing the configuration of a moving area acquisition device according to a first embodiment of the present invention.

Herein below, an embodiment of the present invention will be described with reference to the attached drawings. It should be noted that in the description of the drawings, the same reference numerals are used to denote the same elements, and repetitive description is omitted. Also, for the convenience of illustration, dimensional ratios in the drawings do not necessary coincide with those in the description.

FIG. 1 is a block diagram showing the configuration of a movable area acquisition ECU according to a first embodiment of the present invention. As shown in FIG. 1, a movable area acquisition ECU 1 as a host vehicle moving area acquisition device is a computer of an automotive device which is electronically controlled, and includes a CPU (Central Processing Unit), a ROM (Read Only Memory), a RAM (Random Access Memory), an input/output interface, and the like. The movable area acquisition ECU 1 includes a map database 11, a travel area generating portion 12, an obstacle path predicting portion 13, a host vehicle possible path computing portion 14, an interference evaluating portion 15, and a host vehicle path selecting portion 16. An obstacle sensor 2 is connected to the movable area acquisition ECU 1 via an obstacle extracting portion 3, and also a host vehicle sensor 4 is connected to the movable area acquisition ECU 1.

The obstacle sensor 2 includes a milli-wave radar sensor, a laser radar sensor, an image sensor, and the like, and detects an obstacle such as another vehicle or a passerby around the host vehicle. The obstacle sensor 2 transmits obstacle-related information including information related to the detected obstacle to the obstacle extracting portion 3

The obstacle extracting portion 3 extracts an obstacle from the obstacle-related information transmitted from the obstacle sensor 2, and outputs obstacle information such as the position or moving speed of the obstacle to the obstacle path predicting portion 13 in the movable area acquisition ECU 1. If, for example, the obstacle sensor 2 is a milli-wave radar sensor or laser radar sensor, the obstacle extracting portion 3 detects an obstacle on the basis of the wavelength or the like of a reflected wave reflected from the obstacle. If the obstacle sensor 2 is an image sensor, the obstacle extracting portion 3 extracts, for example, another vehicle as an obstacle from a captured image by pattern matching or other such technique.

The host vehicle sensor 4 includes a position sensor, a speed sensor, a yaw rate sensor, and the like, and detects information related to the travel state of the host vehicle. The host vehicle sensor 4 transmits a host vehicle position information related to the detected position of the host vehicle to the travel area generating portion 12 in the movable area acquisition ECU 1, and also transmits travel state information related to the detected travel state of the host vehicle to the host vehicle possible path computing portion 14 in the movable area acquisition ECU 1. The travel state information on the host vehicle at this time includes, for example, the speed or yaw rate of the host vehicle.

The map database 11 stores map information related to roads to be traveled by an automobile. When the host vehicle position information is transmitted from the host vehicle sensor 4, the travel area generating portion 12 reads the map information from the map database 11, and creates a travel area, which is an area where the host vehicle can travel and corresponds to a moving area according to the present invention, by looking up the position of the host vehicle on a map. The travel area generating portion 12 outputs travel area information related to the generated travel area of the host vehicle to the obstacle path predicting portion 13 and the host vehicle possible path computing portion 14.

The obstacle path predicting portion 13 computes a plurality of predicted paths of an obstacle in the travel area of the host vehicle, on the basis of the obstacle information transmitted from the obstacle extracting portion 3 and the travel area information outputted from the travel area generating portion 12. The obstacle path predicting portion 13 outputs obstacle path information related to the predicted path of the obstacle to the interference evaluating portion 15.

The host vehicle possible path computing portion 14 computes and acquires a plurality of possible paths for the host vehicle in the travel area of the host vehicle, on the basis of the travel area information outputted from the travel area generating portion 12 and the travel state information transmitted from the host vehicle sensor 4. The host vehicle possible path computing portion 14 outputs host vehicle possible path information related to the computed possible paths for the host vehicle to the interference evaluating portion 15.

The interference evaluating portion 15 evaluates the possibility of collision between the host vehicle and an obstacle, on the basis of the obstacle path information outputted from the obstacle path predicting portion 13 and the host vehicle possible path information outputted from the host vehicle possible path computing portion 14. On the basis of this evaluation, the interference evaluating portion 15 computes safety degrees with respect to the plurality of possible paths for the host vehicle. The interference evaluating portion 15 outputs safety degree information related to the safety degree of each of the plurality of host vehicle possible paths to the host vehicle path selecting portion 16.

The term safety degree as used herein refers to the possibility of no collision between the host vehicle and the obstacle, that is, a no collision probability.

The host vehicle path selecting portion 16 selects a host vehicle possible path with the highest safety degree as the optimal host vehicle path on the basis of the safety degree information outputted from the interference evaluating portion 15. If the safety degree of this optimal host vehicle path is equal to or lower than a predetermined threshold, the host vehicle path selecting portion 16 outputs travel area switching information to the travel area generating portion 12. When a travel area switching signal is outputted from the host vehicle path selecting portion 16, the travel area generating portion 12 generates a travel area anew. If the safety degree based on the safety degree information exceeds the predetermined threshold, the host vehicle path selecting portion 16 outputs the optimal host vehicle path to a warning device or a travel control device.

Figure 2:
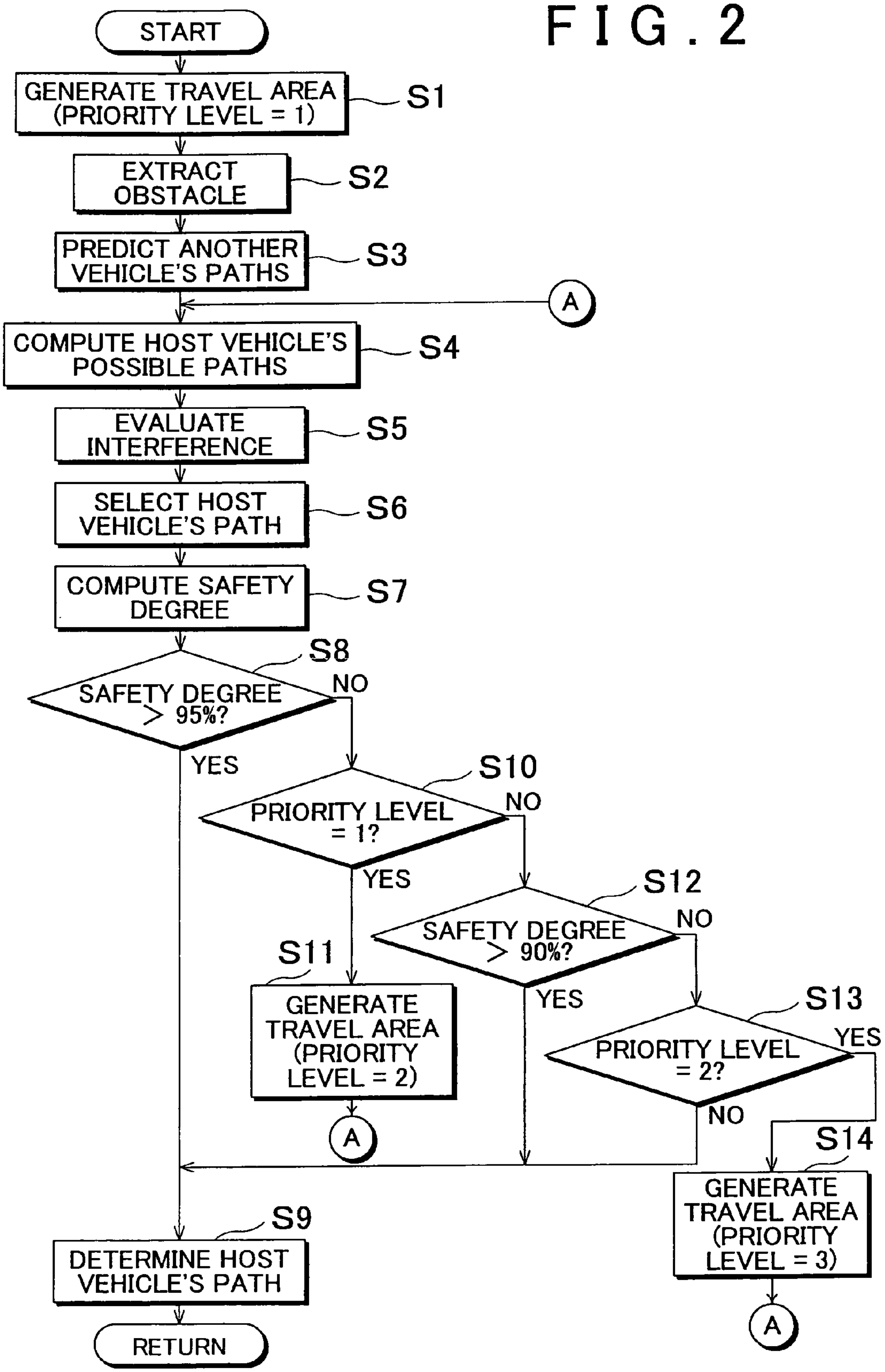
FIG. 2 is a flowchart showing the operation procedure of the moving area acquisition device according to the first embodiment.

Next, a description will be given of the operation of the moving area acquisition device according to this embodiment. FIG. 2 is a flowchart showing the operation procedure of the host vehicle moving area acquisition device.

As shown in FIG. 2, in the moving area acquisition device according to this embodiment, the travel area generating portion 12 generates a travel area in which the host vehicle travels, on the basis of position information transmitted from the host vehicle sensor 4 and map information read from the map database 11 (S1).

The travel area generating portion 12 generates a travel area by referring to an area ID determination table shown in FIG. 3. When generating a travel area, the travel area generating portion 12 first refers to Priority Level 1 shown in FIG. 3, and sets an area in which traffic rules are followed as an area that can be determined as the travel area of the host vehicle. The travel area generating portion 12 adds an area ID "A" corresponding to Priority Level 1 selected at this time to travel area information related to a travel area, and outputs the travel area information to the obstacle path predicting portion 13 and the host vehicle possible path computing portion 14.

As shown in FIG. 3, three levels are set as the levels of priority in generating a travel area. For Priority Level 1 that is used under a steady-state condition, there is set an area in which traffic rules are followed. Set as the steady-state area is an area including lanes such as a lane in which the host vehicle travels, a lane adjacent to this lane which runs in the same direction as the travel direction of the host vehicle or lane that crosses the travel lane, and also a lane the host vehicle can enter by making a right turn or a left turn.

For Priority Level 2 that is used under a non-steady state condition, there is set an area in which some of traffic rules are followed. A first extended area, in which a road shoulder of an expressway, a broad sidewalk or vacant lot, a zebra zone, and the like is added to the area in which traffic rules are followed, is set as the area in which some of traffic rules are followed. When the priority level is set at 2, the travel area generating portion 12 adds an area ID "B" corresponding to Priority Level 2 to travel area information related to a travel area, and outputs the travel area information to the obstacle path predicting portion 13 and the host vehicle possible path computing portion 14.

Further, for Priority Level 3 that is used under a non-steady state condition, there is set a second extended area in which the first extended area is further extended to include the opposing lane or the like and which thus encompasses all areas. When the priority level is set at 3, the travel area generating portion 12 adds an area ID "C" corresponding to Priority Level 3 to travel area information related to a travel area, and outputs the travel area information to the obstacle path predicting portion 13 and the host vehicle possible path computing portion 14. It should be noted that the priority levels set in this case may be set as appropriate in a manner other than the example mentioned above. In particular, while in this embodiment the relationship between areas is such that the first extended area contains the steady-state area, and the second extended area contains the first extended area, the relationship may be set otherwise.

After a travel area is generated, the obstacle extracting portion 3 extracts an obstacle around the host vehicle on the basis of the obstacle-related information transmitted from the obstacle sensor 2 (S2). At this time, another vehicle is extracted as the obstacle. If a plurality of other vehicles are included in the obstacle-related information, the obstacle extracting portion 3 extracts all of these plurality of other vehicles.

After another vehicle is extracted as the obstacle, the obstacle path predicting portion 13 computes a plurality of predicted paths of the other vehicle in the travel area of the host vehicle on the basis of the travel area information and the obstacle-related information (S3). As the paths of the other vehicle, possible paths along which the other vehicle can move are each computed as a trajectory in a time-space defined by time and space for each such other vehicle. In this case, as the possible paths along which the other vehicle can move, rather than specifying a given arrival point and then computing the paths to this arrival point, paths in which the other vehicle will move until a predetermined moving time elapses is obtained. In general, a road is not a place where safety is guaranteed in advance. Hence, even when arrival points for the host vehicle and the other vehicle are obtained in order to determine the possibility of collision between the host vehicle and the other vehicle, this does not necessarily ensure reliable collision avoidance.

Figure 4:
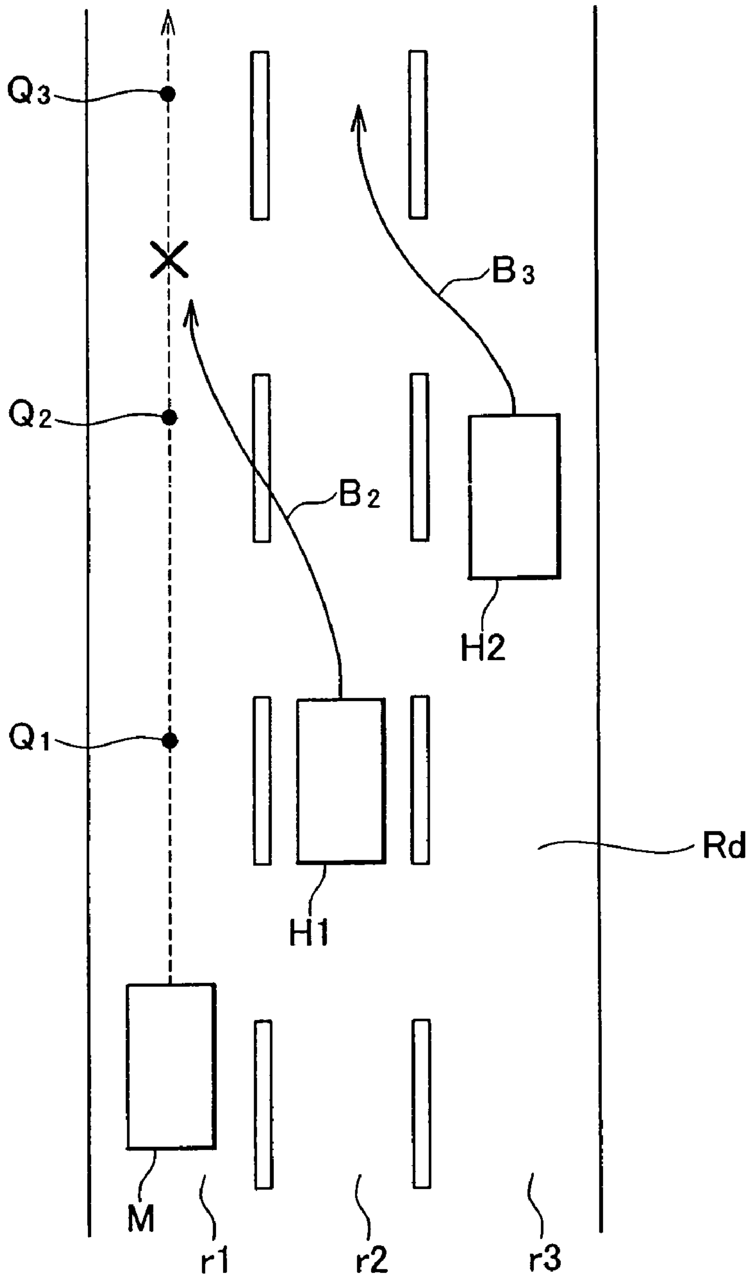
FIG. 4 is a schematic diagram schematically showing the travel state of a host vehicle and other vehicles.

For example, suppose a case shown in FIG. 4 where, on a three-lane road Rd, a host vehicle M is traveling in a first lane r1, a first other vehicle H1 is traveling in a second lane r2, and a second other vehicle H2 is traveling in a third lane r3. At this time, in order to avoid collision between the host vehicle M and the other vehicles H1, H2 respectively traveling in the second and third lanes r2, r3, it would be appropriate for the host vehicle M to travel in such a way as to arrive at positions Q1, Q2, Q3. However, if the second other vehicle H2 takes a path B3 so as to change to the second lane r2, the first other vehicle H1 will presumably take a path B2 to avoid collision with the second other vehicle H2 and thus will enter the first lane r1. In this case, if the host vehicle M travels so as to arrive at the positions Q1, Q2, Q3, there is a danger of collision with the first other vehicle H1.

Figure 5:
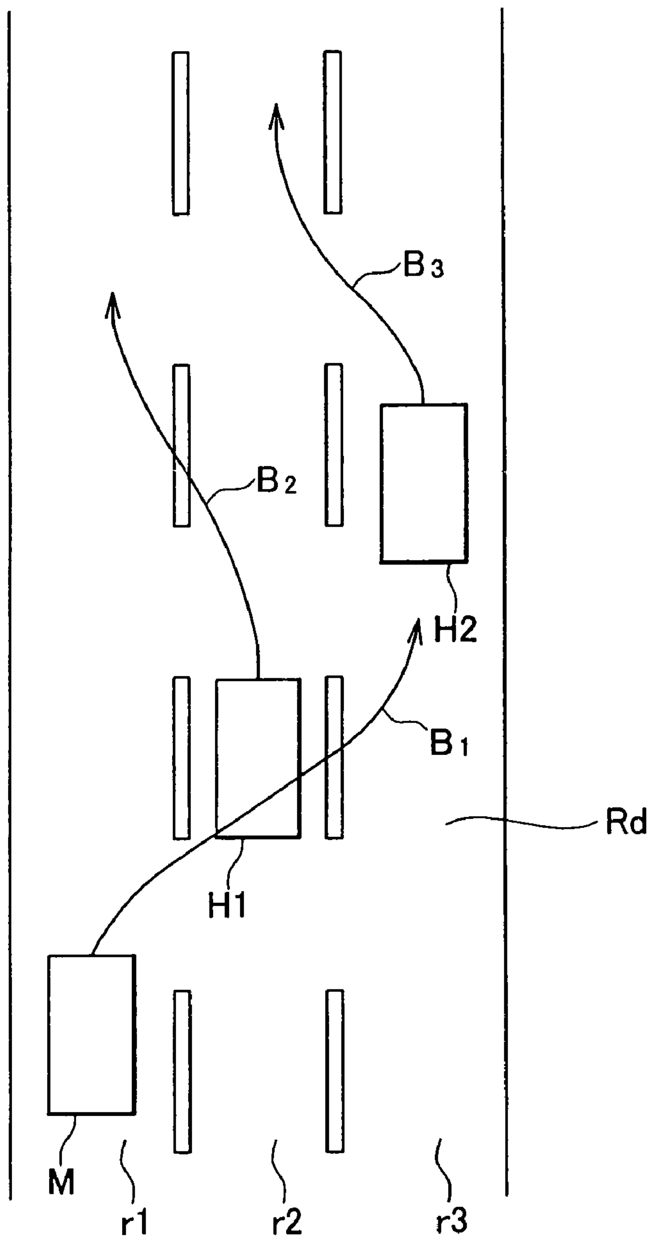
FIG. 5 is a schematic diagram schematically showing a possible path that can be taken by a host vehicle.

Accordingly, rather than setting arrival positions with respect to the host vehicle and the other vehicle in advance, the paths of the host vehicle and other vehicle are predicted on an as-need basis. By predicting the paths of the host vehicle and other vehicles on an as-need basis, it is possible to properly avoid danger to the host vehicle M during travel and ensure safety by taking a path B1 shown in FIG. 5 as the path of the host vehicle.

While in the above-mentioned prediction in which the other vehicle will move until a predetermined moving time elapses is specified, alternatively, possible paths for the other vehicles until the travel distance traveled by the other vehicle reaches a predetermined distance may be obtained. In this case, the predetermined distance may be changed as appropriate in accordance with the speed of the other vehicle (or the speed of the host vehicle).

Possible paths for another vehicle are computed as follows for each such other vehicle. An initialization process is performed whereby the value of a counter k for identifying another vehicle is set to 1, and the value of a counter n indicating the number of times a possible path is generated with respect to the same other vehicle is set to 1. Subsequently, the position and moving state (speed and moving direction) of the other vehicle based on other-vehicle information transmitted from the obstacle sensor 2 and extracted from other-vehicle-related information are set to the initial state.

Subsequently, from among a plurality of behaviors that can be selected as behaviors of the other vehicle assumed to be taken during a fixed time Δt after the initialization, one behavior is selected in accordance with a behavior selection probability assigned to each behavior. The behavior selection probability with which one behavior is selected is defined by, for example, associating elements of a set of behaviors that can be selected with predetermined random numbers. In this sense, different behavior selection probabilities may be assigned to individual behaviors, or an equal probability may be assigned to all the elements of a set of behaviors. Also, the behavior selection probability may be made dependent on the position and travel state of the other vehicle or the surrounding road condition.

Such selection of a behavior of the other vehicle assumed to be taken during the fixed time Δt based on the behavior selection probability is repeated, and a behavior of the other vehicle taken until the elapse of a predetermined moving time for which the other vehicle moves is selected. One possible path for the other vehicle is computed on the basis of the behavior of the other vehicle thus selected.

Upon computing one possible path for the other vehicle, a plurality of (N) possible paths for the other vehicle are computed through the same procedure. Even when the same procedure is employed, since one behavior is selected in accordance with a behavior selection probability assigned to each behavior, different possible paths are computed in most cases. The number of possible paths computed at this time may be determined in advance as, for example, 1000 (N=1000). Of course, the number of the plurality of possible paths computed may be different, for example, between several hundreds and several tens of thousand. The possible paths thus calculated are set as the predicted paths of the other vehicle.

If there are a plurality of other vehicles that have been extracted, possible paths are computed for each of those plurality of other vehicles.

Once the prediction of the paths of the other vehicle is completed, on the basis of travel area information outputted from the travel area generating portion 12 and travel state information transmitted from the host vehicle sensor 4, the host vehicle possible path computing portion 14 computes a plurality of host vehicle's possible paths, which are the paths along which the host vehicle can move within the travel area of the host vehicle (S4).

Each possible path for the host vehicle is predicted on the basis of a behavior of the host vehicle that is assumed to be taken during the fixed time Δt, from the travel state of the vehicle obtained by the speed or yaw rate transmitted from the host vehicle sensor 4. The behavior of the host vehicle that is assumed to be taken during the fixed time Δt is obtained by using a behavior selection probability assigned to each of a plurality of behaviors that are assumed to be taken by the host vehicle, relative to the current travel state of the host vehicle.

For example, the behavior selection probability is set such that if the current travel state of the host vehicle indicates high vehicle speed, a behavior in which the distance traveled by the host vehicle becomes large is likely to be selected, and if the yaw rate has gone to either the left or right, a behavior in which the host vehicle faces in that direction is likely to be selected. Further, as the behavior selection probability, an equal probability may be assigned to all of the elements of a set of behaviors. By selecting a behavior by using a speed or yaw rate as the travel state of the host vehicle, the path of the host vehicle can be predicted with good accuracy. Alternatively, a vehicle speed or estimated curve radius in the travel state of the vehicle may be computed from a speed or yaw rate transmitted from the host vehicle sensor 4, and one possible path for the host vehicle may be obtained from the speed or the yaw rate.

Subsequently, another possible path for the host vehicle is obtained by the same procedure. At this time, when obtaining a possible path for the host vehicle by the same procedure, a path of the host vehicle is computed by using a behavior of the vehicle based on a behavior selection probability assigned in advance. Hence, even when another possible path for the host vehicle is obtained by the same procedure, different possible paths are obtained in most cases. By repeating the same procedure in this way, a plurality of possible paths are computed for the host vehicle.

After the host vehicle's possible paths are computed, the interference evaluating portion 15 makes an interference evaluation (S5). An interference evaluation is made by evaluating the possibility of collision between the host vehicle and an obstacle on the basis of the obstacle path information outputted from the obstacle path predicting portion 13 and the host vehicle possible path information outputted from the host vehicle possible path computing portion 14. Now, an example of the predicted paths of the other vehicle and the possible paths for the host vehicle respectively obtained in steps S3 and S4 is represented by a three-dimensional space shown in FIG. 6. In the three-dimensional space shown in FIG. 6, the current position of a vehicle is represented on an x-y plane defined by an x-axis and a y-axis, with a t-axis set as the time axis. Therefore, predicted paths of the other vehicle and possible paths for the host vehicle are represented by (x, y, t) coordinates, and trajectories obtained by projecting the respective paths of the other vehicle and host vehicle onto the x-y plane are the travel trajectories in which the other vehicle and the host vehicle are predicted to travel on a road.

Figure 6:
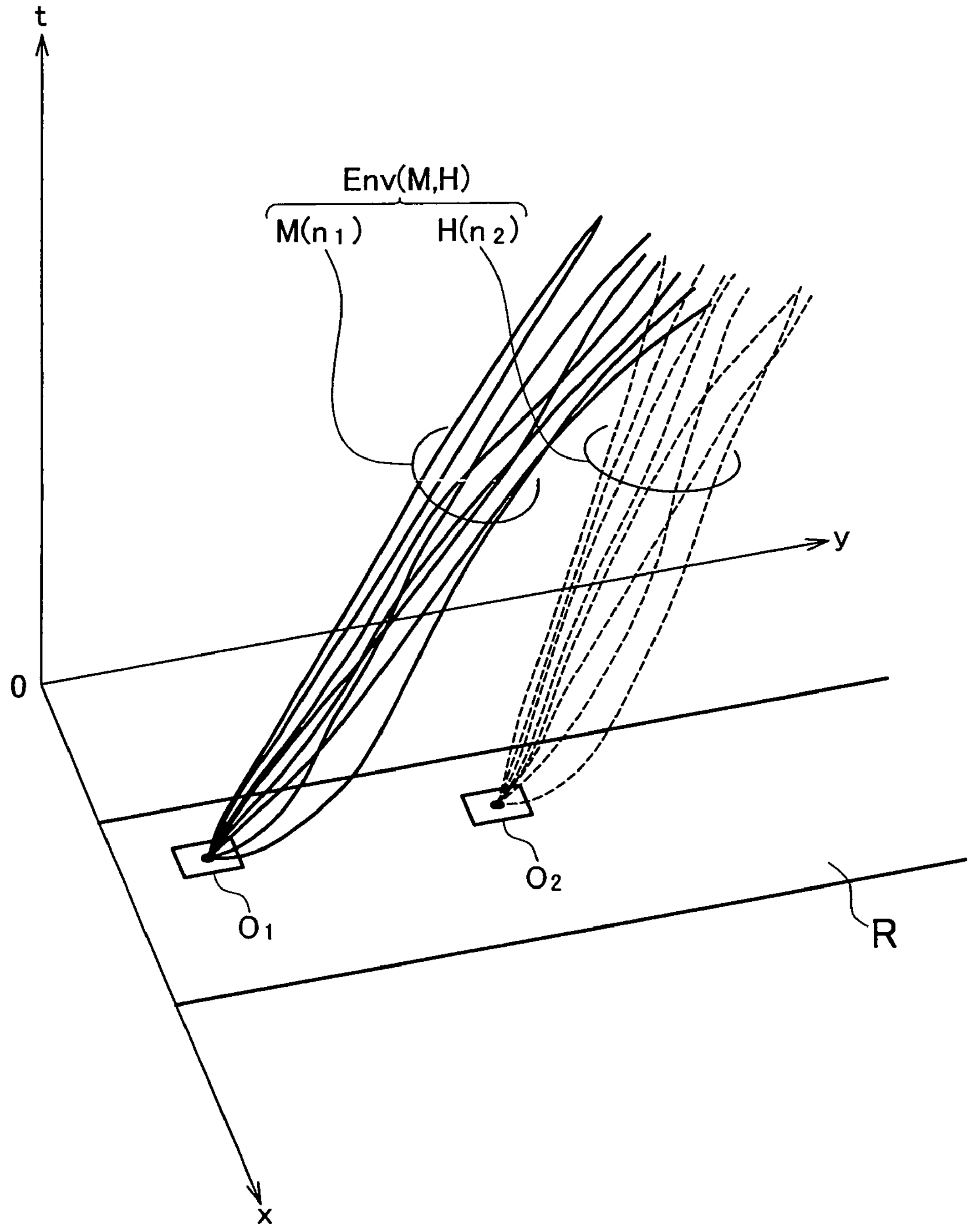
FIG. 6 is a graph showing the configuration of a time-space environment including a plurality of possible paths for a host vehicle and a plurality of predicted paths of another vehicle.

The predicted paths of the other vehicle and the possible paths for the host vehicle which are thus predicted are expressed in the space shown in FIG. 6 in this way, thus forming a time-space environment including a set of predicted paths that can be taken by a plurality of vehicles (the other vehicle and the host vehicle) that exist within a predetermined range in three-dimensional time-space. A time-space environment Env(M, H) shown in FIG. 6 represents a set of predicted paths of the other vehicle H and possible paths for the host vehicle M, and includes a predicted path set for the other vehicle {H(n2)} and a possible path set for the host vehicle M {M(n1)}. More specifically, the time-space environment Env(M,H) represents a time-space environment in a case where the other vehicle H and the host vehicle M are traveling in the +y-axis direction on a smooth and linear road Rd such as an expressway. Since predicted paths and possible paths are obtained independently for each of the other vehicle H and the host vehicle M without taking the correlation between the other vehicle H and the host vehicle M into consideration, the predicted paths and possible paths for these two vehicles may sometimes cross in time-space.

Once the predicted paths of the host vehicle M and the other vehicle M and the possible paths for the host vehicle M are obtained in this way, the probability of collision with the other vehicle H if the host vehicle takes each of the possible paths is obtained. If a predicted path of the other vehicle H and a possible path for the host vehicle M cross, this means that a collision will occur between the other vehicle H and the host vehicle M. In this regard, a predicted path of the other vehicle H and a possible path for the host vehicle M are obtained on the basis of a predetermined behavior selection probability. Therefore, on the basis of the number of predicted paths that cross a predicted path of the host vehicle M out of the plurality of predicted paths of the other vehicle H, it is possible to obtain the probability of collision between the other vehicle H and the host vehicle M if the host vehicle travels along the predicted path. For example, if 1000 predicted paths of the other vehicle H are computed, and 5 predicted paths out of the 1000 predicted paths cross a predicted path of the host vehicle M, the collision probability (collision possibility) $P_A$ is computed to be 0.5%. Stated conversely, the remaining 99.5% is the probability of no collision between the host vehicle M and the other vehicle H (no-collision probability).

In a case where a plurality of the other vehicles H have been extracted, the collision probability $P_A$ with which the host vehicle will collide with at least one of the plurality of other vehicles can be obtained by Equation (1) below.

$$P_A = 1 - \prod_{i=1}^{k} (1 - P_{Ai}) \tag{1}$$

Here, k represents the number of other vehicles extracted, and $P_A k$ represents the probability of collision with the k-th vehicle. In this way, a plurality of predicted paths of the other vehicle H are computed, and the possibility of collision between the host vehicle M and the other vehicle H is predicted by using the plurality of predicted paths, thus calculating a wide range of paths that can be taken by the other vehicle. Therefore, a collision probability can be computed by also taking into account cases where there is a large change in the path of the other vehicle, such as when an accident or the like occurs at a branching location such as an interportion. This collision probability between the other vehicle H and the host vehicle M is computed with respect to all of the possible paths computed for the host vehicle M.

Once the interference evaluation is made in this way, in the host vehicle path selecting portion 16, collision probabilities computed with respect to individual possible paths for the host vehicle M for which host vehicle path selection is to be made (S6) are compared with each other, and a possible path with the lowest collision probability is obtained. This possible path is specified as a provisional optimal possible path, and selected as the host vehicle path.

Once the path of the host vehicle is selected, a safety degree (no-collision probability) is computed with respect to the selected provisional optimal possible path (S7). The safety degree of the provisional optimal possible path is simply defined as, for example, a value obtained by subtracting the collision probability for the provisional optimal possible path from 100(%). Alternatively, for example, the safety degree may be defined as a value obtained by subtracting the reciprocal of the collision probability for the provisional optimal possible path from 1. Further, the safety degree may be computed by taking other conditions into account.

Once the safety degree of the provisional optimal possible path is obtained, it is determined whether or not the safety degree for the provisional optimal possible path exceeds a predetermined first threshold of 95% (S8). If it is determined as a result that the safety degree exceeds 95%, it is regarded that the possibility of the host vehicle M colliding with the other vehicle H can be denied almost entirely, so the provisional optimal possible path is determined as the host vehicle path (S9), and the processing is terminated.

On the other hand, if the safety degree for the provisional optimal possible path is equal to or lower than 95%, it is determined whether or not the priority level is 1 (S10). If it is determined as a result that the priority level is 1, the travel area of the host vehicle can be further extended, so the priority level of the travel area is set to 2 to adjust the travel area (S11), and the processing returns to step S4. At this time, by setting the priority level of the travel area of the host vehicle to 2, the range of the area where the host vehicle can travel is extended to the area of Priority Level 2. Accordingly, possible paths for the host vehicle can be computed within an enlarged range. Thereafter, steps S4 to S7 are repeated, thus computing a provisional optimal possible path anew.

When the provisional optimal possible path is computed anew, if the safety degree exceeds 95%, as in the case where the priority level is 1, it is regarded that the possibility of the host vehicle M colliding with the other vehicle H can be denied almost entirely, so the provisional optimal possible path is determined as the host vehicle path (S9), and the processing is terminated. If the safety degree is determined to be equal to or lower than 95%, it is determined whether or not the priority level is 1 (S10). If the priority level is not 1, the processing proceeds to step S12.

In this case, it is determined whether or not the safety degree exceeds 90% (S12). As a result, it is regarded that when the priority level of the travel area is 2, the possibility of the host vehicle M colliding with the other vehicle H can be denied almost entirely if the safety degree exceeds 90%, and the provisional optimal possible path is determined as the host vehicle path (S9).

On the other hand, if the safety degree is determined to be equal to or lower than 90%, it is determined whether or not the priority level is 2 (S13). If it is determined as a result that the priority level is 2, the travel area is extended and the priority level of the travel area is set to 3, and the processing returns to step S4. At this time, by setting the priority level of the travel area of the host vehicle to 3, the range of the area where the host vehicle can travel is extended to the area of Priority Level 3. Accordingly, possible paths for the host vehicle can be computed within a further enlarged range. Thereafter, steps S4 to S7 are repeated, thus computing a provisional optimal possible path anew.

Thereafter, the safety degree is compared in the same manner in steps S8 and S12, and if the safety degree exceeds 95% or 90% in each of these steps, the provisional optimal possible path is determined as the host vehicle path (S9). If the safety degree is determined to be equal to or lower than 90% in step S12, it is determined whether or not the priority level is 2 (S13). If it is determined as a result that the priority level is not 2, the safety degrees of the provisional optimal possible paths respectively computed at Priority Levels 1 to 3 are compared with each other, and the provisional optical possible path with the highest safety degree is determined as the host vehicle path (S9). Then, the processing is terminated.

Figure 7A:
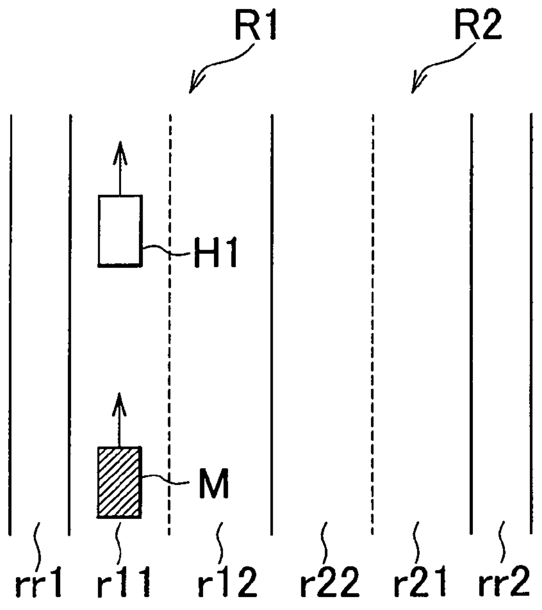
FIG. 7A is a schematic diagram schematically showing the travel state of a host vehicle and another vehicle in a case where the other vehicle ahead of the host vehicle is located in the same lane.
Figure 7B:
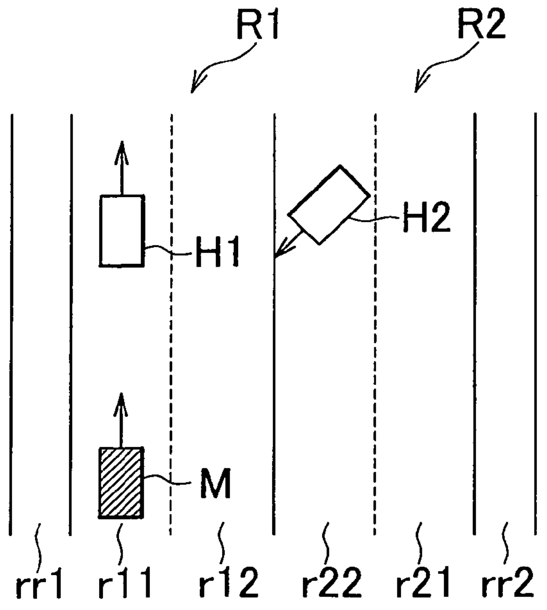
FIG. 7B is a schematic diagram schematically showing the travel state of a host vehicle and other vehicles in a case where the other vehicles ahead of the host vehicle are located in the same lane and in the opposite lane.

The above-described host vehicle moving area acquisition device according to this embodiment determines a host vehicle path so as to avoid an obstacle such as another vehicle. For example, it is assumed that as shown in FIG. 7A, the host vehicle is traveling in an outer lane r11 of a left lane R1 as seen from the host vehicle M, and that the first other vehicle H1 is also traveling in the outer lane r11 of the left lane R1. Further, it is assumed that as shown in FIG. 7B, the second other vehicle H2 is traveling in an inner lane r22 of a right lane R2 as seen from the host vehicle M.

Figure 8A:
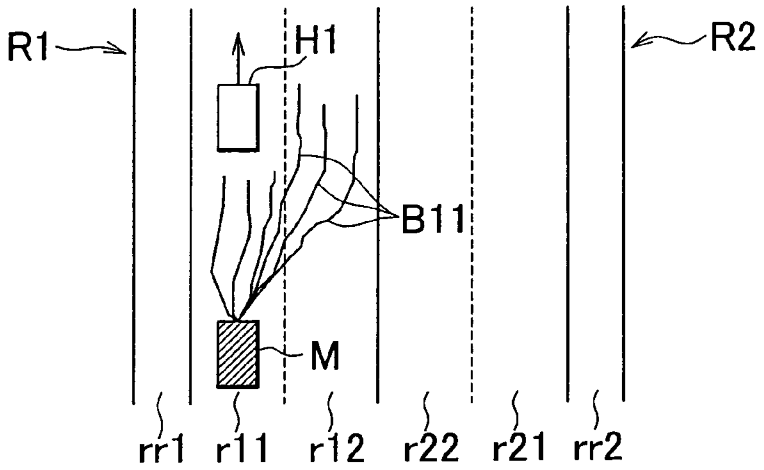
Figure 8B:
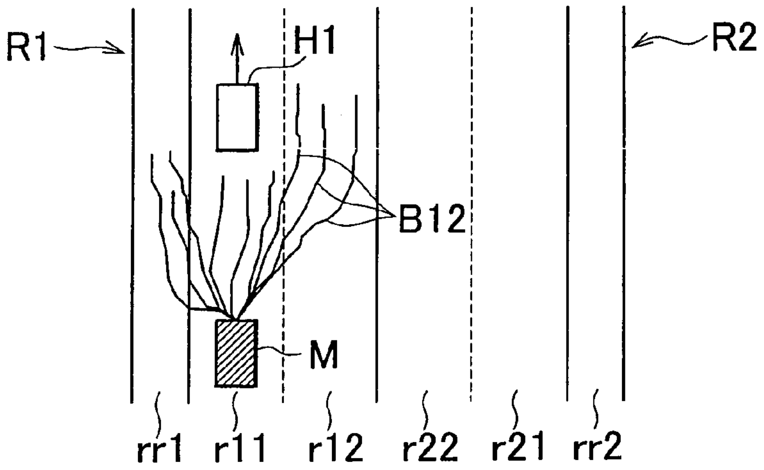

At this time, if the priority level of the travel area is 1, a plurality of possible paths for the host vehicle M are computed while setting only the left lane R1 in which the host vehicle M travels as the travel area. In this case, as shown in FIG. 8A, a plurality of possible paths B11 for the host vehicle M are computed within the left lane R1. If the priority level of the travel area is 2, as shown in FIG. 8B, a plurality of possible paths B12 for the host vehicle M are computed with a left road shoulder rr1 included in the travel area in addition to the left lane R1. Further, if the priority level of the travel area is 3, as shown in FIG. 8C, a plurality of possible paths B13 for the host vehicle M are computed with the right lane R2 and a left road shoulder rr2 included in the travel area in addition to the left lane R1 and the left road shoulder rr1.

Figure 9A:
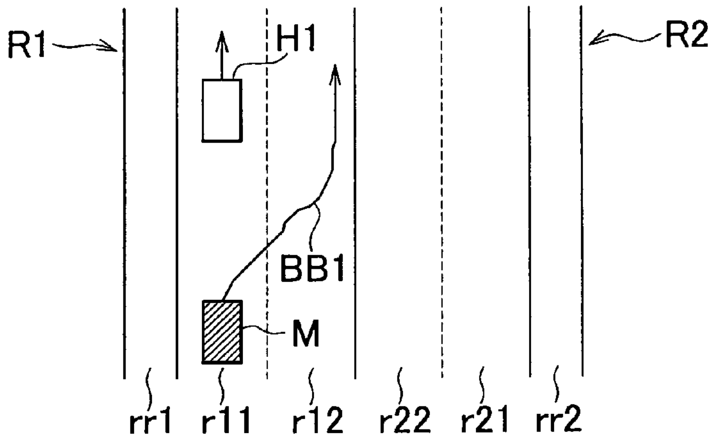

Then, as shown in FIG. 9A, a first provisional optimal possible path BB1 with the highest safety degree is obtained from among the possible paths B11 within the left lane R1. If the safety degree of the first provisional optimal possible path BB1 exceeds 95%, the corresponding possible path B11 within the left lane R1 is determined as the host vehicle path.

Figure 9B:
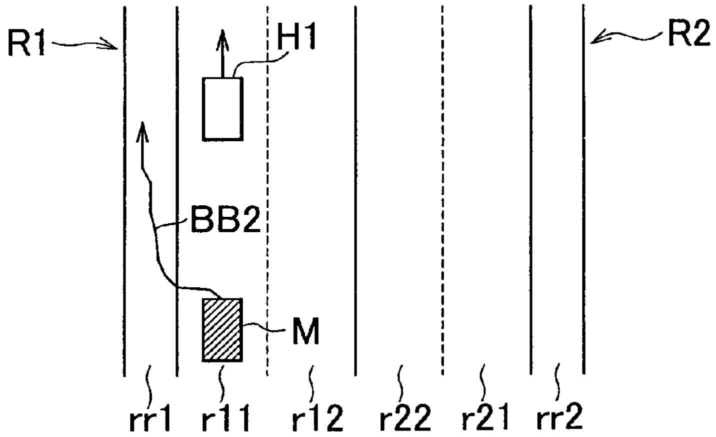

If the safety degree of the first provisional optimal possible path BB1 within the left lane R1 is equal to or lower than 95%, from among the possible paths B12 in the travel area including the left road shoulder rr1 in addition to the left lane R1 as shown in FIG. 8B, a second provisional optimal possible path BB2 with the highest safety degree is obtained as shown in FIG. 9B. If the safety degree of the second provisional optimal possible path BB2 exceeds 90%, the corresponding possible path B12 in the travel area including the left road shoulder rr1 in addition to the left lane R1 is determined as the host vehicle path.

Figure 8C:
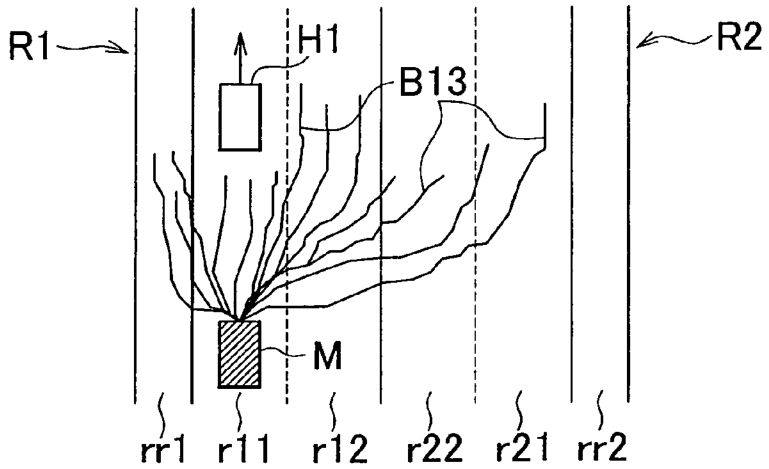
Figure 9C:
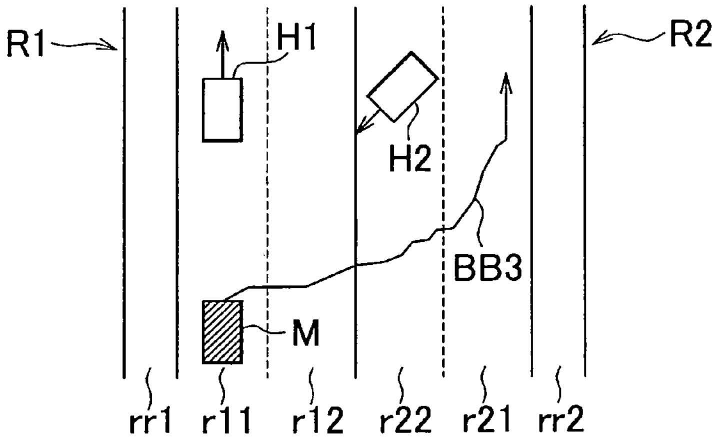

Further, if the safety degree of the second provisional optimal possible path BB2 in the travel area including the left road shoulder rr1 in addition to the left lane R1 is equal to or lower than 90%, from among the possible paths B13 in all areas further including the right lane R2 and the right road shoulder rr2 as shown in FIG. 8C, a third provisional optimal possible path BB3 with the highest safety degree is obtained as shown in FIG. 9C. In this case, for example, the collision possibility between the second other vehicle H2 in the right lane R2 and the host vehicle M is also taken into account and thus the safety degree of the third provisional optimal possible path BB3 may significantly fall below the safety degrees of the second provisional optimal possible path BB2 and first provisional optimal possible path BB1. Accordingly, of the first to third provisional optimal possible paths, the provisional optimal possible path with the highest safety degree is determined as the host vehicle path.

In this way, if the safety degree of a provisional optimal possible path is equal to or lower than a predetermined threshold, an extended area in which the moving area of the host vehicle is extended is acquired, thereby making it possible to avoid collision with an obstacle in a suitable manner. Further, in a case where, under a non-steady state condition such as when the obstacle is not another vehicle or the like but a location or the like where an accident has occurred, an area where the host vehicle is unable to travel has been created, by performing the same procedure as described above, the travel area can be switched so as to avoid the area where the host vehicle is unable to travel. Therefore, the moving area of the host vehicle can be acquired appropriately even when there is an area where the host vehicle is unable to travel due to an accident or the like.

Figure 10:
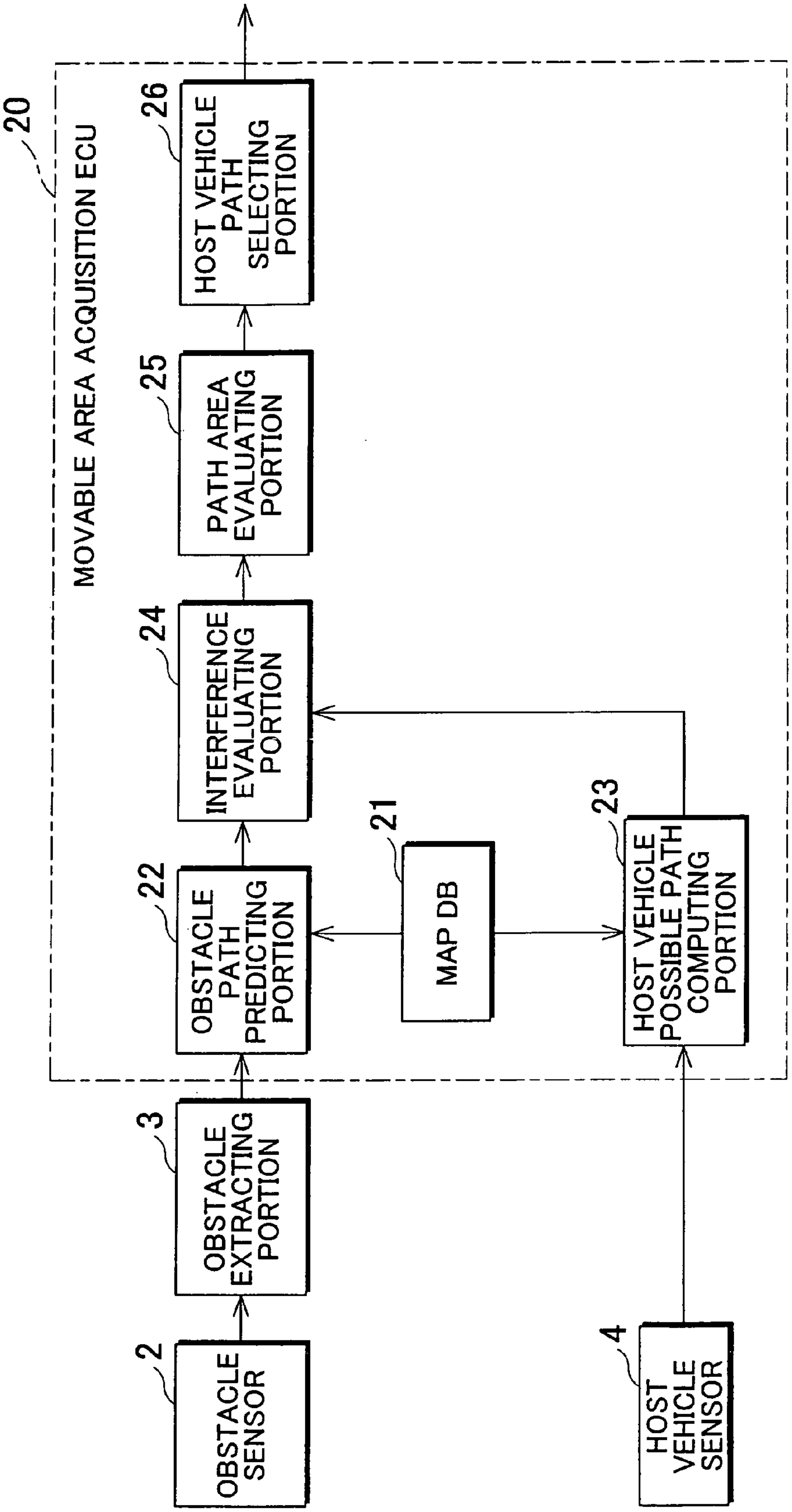
FIG. 10 is a block diagram showing the configuration of a moving area acquisition device according to a second embodiment of the present invention.

Next, a second embodiment of the present invention will be described. FIG. 10 is a block diagram showing the configuration of a movable area acquisition ECU according to the second embodiment.

As shown in FIG. 10, a movable area acquisition ECU 20 as a host vehicle moving area acquisition device according to this embodiment includes a map database 21, an obstacle path predicting portion 22, a host vehicle possible path computing portion 23, an interference evaluating portion 24, a path area evaluating portion 25, and a host vehicle path selecting portion 26. The obstacle sensor 2 is connected to the movable area acquisition ECU 20 via the obstacle extracting portion 3, and also the host vehicle sensor 4 is connected to the movable area acquisition ECU 20.

The host vehicle sensor 4 transmits the detected position of a host vehicle to the obstacle path predicting portion 22 in the movable area acquisition ECU 20, and also transmits travel state information related to the detected travel state of the host vehicle to the host vehicle possible path computing portion 23 in the movable area acquisition ECU 20.

The map database 21 stores map information related to roads to be traveled by an automobile. When the obstacle path predicting portion 22 or the host vehicle possible path computing portion 23 reads map information, the map database 21 outputs the map information to the obstacle path predicting portion 22 or the host vehicle possible path computing portion 23.

The obstacle path predicting portion 22 generates a travel area of the host vehicle on the basis of the position of the host vehicle transmitted from the host vehicle sensor 4 and the map information outputted from the map database 21. The travel area of the host vehicle at this time is set to include all areas in which the host vehicle can travel. The obstacle path predicting portion 22 computes a plurality of predicted paths of an obstacle in the travel area of the host vehicle, on the basis of obstacle information transmitted from the obstacle extracting portion 3 and each generated travel area of the host vehicle. The obstacle path predicting portion 22 outputs the computed paths of the obstacle in the travel area as obstacle path information to the interference evaluating portion 24.

The host vehicle possible path computing portion 23 generates a travel area of the host vehicle on the basis of the position of the host vehicle based on the host vehicle position information, which is included in the travel state information transmitted from the host vehicle sensor 4, and map information outputted from the map database 21. The travel area of the host vehicle at this time is set to include all areas in which the host vehicle can travel. Further, on the basis of travel state information transmitted from the host vehicle sensor 4 and the generated travel area of the host vehicle, the host vehicle possible path computing portion 23 computes a plurality of possible paths for the host vehicle in the travel area of the host vehicle. The host vehicle possible path computing portion 23 outputs possible path information for the host vehicle in the travel area to the interference evaluating portion 24.

The interference evaluating portion 24 evaluates the possibility of collision between the host vehicle and an obstacle in each possible path of the host vehicle, on the basis of the obstacle path information outputted from the obstacle path predicting portion 22 and the host vehicle possible path information outputted from the host vehicle possible path computing portion 23. On the basis of this evaluation, the interference evaluating portion 24 computes a safety degree with respect to each of the plurality of possible paths for the host vehicle. The interference evaluating portion 24 outputs safety degree information related to the safety degree of each of the plurality of possible paths for the host vehicle to the path area evaluating portion 25.

The path area evaluating portion 25 stores the area ID determination table shown in FIG. 3. Further, the path area evaluating portion 25 checks the plurality of possible paths for the host vehicle and the safety degree in each of the possible paths for the host vehicle which are based on the safety degree information outputted from the interference evaluating portion 24, against the area ID determination table shown in FIG. 3. In this way, the path area evaluating portion 25 determines to which one of the areas indicated by the area IDs A to C each of the possible paths for the host vehicle belong, and determines the area ID for each of the possible paths for the host vehicle. The path area evaluating portion 25 outputs the determined area ID based on each possible path for the host vehicle and the safety degree in each possible path for the host vehicle to the host vehicle path selecting portion 26. It should be noted that a configuration may be adopted in which the area ID table is read from the map database 21.

The host vehicle path selecting portion 26 selects an optimal host vehicle path on the basis of the area ID based on each possible path for the host vehicle and the safety degree in each possible path. The procedure for determining the host vehicle path is the same as the procedure of steps S8 to S14 shown in FIG. 2. In this embodiment, the travel area is adjusted and the priority level of the travel area is determined in the host vehicle path selecting portion 26, and the host vehicle path is determined in the travel area corresponding to this priority level.

While embodiments of the present invention have been described above, the present invention is not limited to the above-mentioned embodiments. For example, while in the above-mentioned embodiments the areas indicated by the area IDs “A” to “C” are determined as the “area in which traffic rules are followed”, “area in which some of traffic rules are followed” and “all areas”, respectively, the respective areas may be determined in another way. Further, the number of steps in which the areas to be determined at this time are varied is not necessarily limited to three but may be a different number of steps. Further, while another vehicle is assumed as an obstacle in the above-mentioned embodiments, a living being such as a passerby may be assumed as an obstacle. It should be noted that while a plurality of paths of another vehicle are acquired in the above-mentioned embodiments, this should not be construed restrictively. It is also possible to adopt a simple configuration in which the number of paths of another vehicle is small, by introducing a simple probability model equivalent to the path distribution shown in FIG. 6.

What is claimed is:

1. A host vehicle moving area acquisition device comprising:
- a moving area setting portion configured to set a moving area in which a host vehicle can move; and
- a traffic condition acquisition portion configured to acquire a traffic condition around the host vehicle;

wherein:
- the moving area setting portion is configured to adjust the moving area on the basis of the traffic condition;
- the traffic condition acquisition portion includes:
  - a host vehicle path acquisition portion configured to acquire a plurality of paths of the host vehicle in the moving area;
  - an obstacle path acquisition portion configured to acquire a path of an obstacle in the vicinity of the host vehicle; and
  - a safety degree acquisition portion configured to acquire a safety degree on the basis of each of the paths of the host vehicle and the path of the obstacle, wherein a higher safety degree represents a probability of no collision between the host vehicle and the obstacle;
- the traffic condition includes the safety degree acquired by the safety degree acquisition portion; and
- the moving area setting portion is configured to acquire an extended area in which the moving area of the host vehicle is extended, if the safety degree is equal to or lower than a predetermined threshold, wherein the extended area allows for the creation of additional paths for the host vehicle so as to avoid collision.

2. The host vehicle moving area acquisition device according to claim 1, wherein the safety degree acquisition portion includes a path selecting portion configured to acquire a safety degree in each of the plurality of paths of the host vehicle by computing a probability of collision between the host vehicle and the obstacle in each of the plurality of paths of the host vehicle, and selects a path with the highest safety degree.

3. The host vehicle moving area acquisition device according to claim 2, wherein the moving area setting portion is configured to determine whether or not a safety degree with respect to the path with the highest safety degree exceeds the threshold, and is configured to determine the path with the lowest probability of collision as a host vehicle path if the safety degree exceeds the threshold.

4. The host vehicle moving area acquisition device according to claim 1, wherein:
- the traffic condition acquisition portion further includes an obstacle information acquisition portion configured to acquire information of the obstacle in the vicinity of the host vehicle, a host vehicle information acquisition portion configured to acquire a position and travel state of the host vehicle, and a map database;
- the moving area setting portion sets the moving area of the host vehicle on the basis of the position of the host vehicle and information in the map database;
- the obstacle path acquisition portion is configured to acquire the path of the obstacle on the basis of the obstacle information and the moving area; and
- the host vehicle path acquisition portion is configured to acquire each of the paths of the host vehicle on the basis of the travel state and the moving area of the host vehicle.

5. The host vehicle moving area acquisition device according to claim 4, wherein the moving area setting portion is configured to set an acquired extended area as the moving area in which the host vehicle can move, if the safety degree is equal to or lower than the threshold.

6. The host vehicle moving area acquisition device according to claim 1, wherein the moving area setting portion is configured to switch between a steady-state moving area under a steady state condition and a non-steady state moving area under a non-steady state condition on the basis of the traffic condition.

7. The host vehicle moving area acquisition device according to claim 1, wherein the moving area setting portion is configured to switch between a steady-state moving area under a steady-state condition and a non-steady state moving area under a non-steady state condition if the safety degree is equal to or lower than the threshold.

8. The host vehicle moving area acquisition device according to claim 7, wherein:
- the steady-state moving area is an area in which traffic rules are followed and which includes a travel lane in which the host vehicle travels, a lane that is adjacent to the travel lane and runs in the same direction as a travel direction of the host vehicle, and a lane that crosses the travel lane and into which the host vehicle can make a right turn or a left turn; and
- the non-steady state moving area is an extended area in which the steady-state moving area is extended to include at least one of a road shoulder of an expressway, a broad sidewalk or vacant lot, a zebra zone, and an opposing lane.

9. A host vehicle moving area acquisition method comprising:
- setting a moving area in which a host vehicle can move;
- predicting a path of an obstacle in the moving area;
- predicting a path of the host vehicle in the moving area on the basis of a travel state of the host vehicle;
- computing a safety degree with respect to the path of the host vehicle, on the basis of the path of the obstacle and the path of the host vehicle, wherein a higher safety degree represents a probability of no collision between the host vehicle and the obstacle;

determining whether or not the safety degree exceeds a threshold; and switching the moving area to an extended area in which the moving area of the host vehicle is extended if the safety degree is equal to or lower than the threshold, wherein the extended area allows for the creation of additional paths for the host vehicle so as to avoid collision.

10. The host vehicle moving area acquisition method according to claim 9, wherein the non-steady state moving area is an extended area of the steady-state moving area.

* * * * *

UNITED STATES PATENT AND TRADEMARK OFFICE

CERTIFICATE OF CORRECTION

PATENT NO. : 7,961,084 B2
APPLICATION NO. : 12/155437
DATED : June 14, 2011
INVENTOR(S) : Kazuaki Aso et al.

It is certified that error appears in the above-identified patent and that said Letters Patent is hereby corrected as shown below:

On the cover page, item (73) Assignee:
change: "Toyota Jidosha Kabushiki Kaisha,
Tokyo, (JP)"

to: --Toyota Jidosha Kabushiki Kaisha,
Toyota, (JP)--

Signed and Sealed this
Sixteenth Day of August, 2011

David J. Kappos
*Director of the United States Patent and Trademark Office*